Feb. 4, 1964     J. W. HUDSON     3,120,575
FLEXIBLE MULTIPLE CONDUCTOR CABLE AND MOUNTING MEANS THEREFOR
Filed Dec. 5, 1960     2 Sheets-Sheet 1
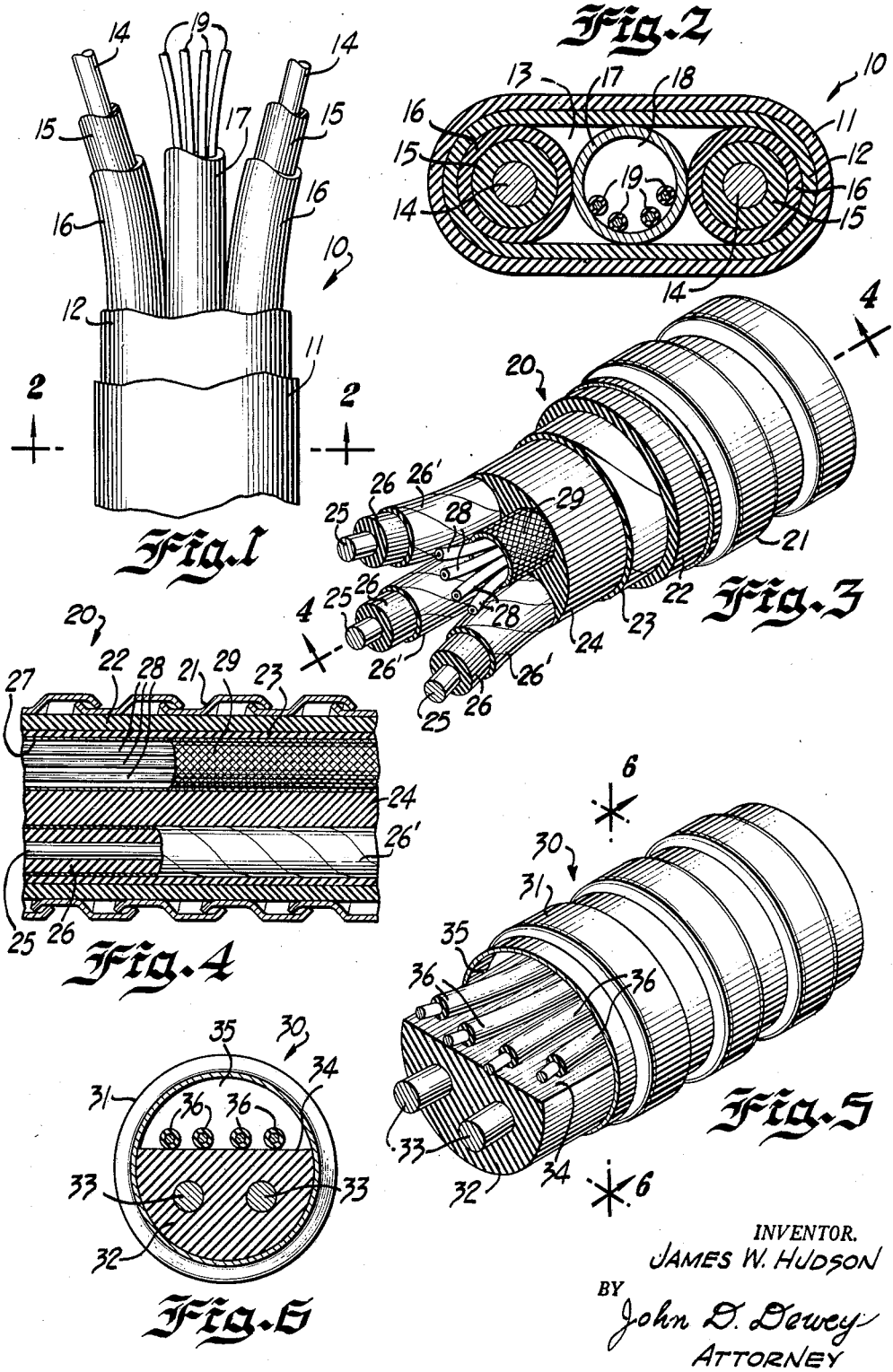
INVENTOR.
JAMES W. HUDSON
BY John D. Dewey
ATTORNEY Feb. 4, 1964 J. W. HUDSON 3,120,575
FLEXIBLE MULTIPLE CONDUCTOR CABLE AND MOUNTING MEANS THEREFOR
Filed Dec. 5, 1960 2 Sheets-Sheet 2
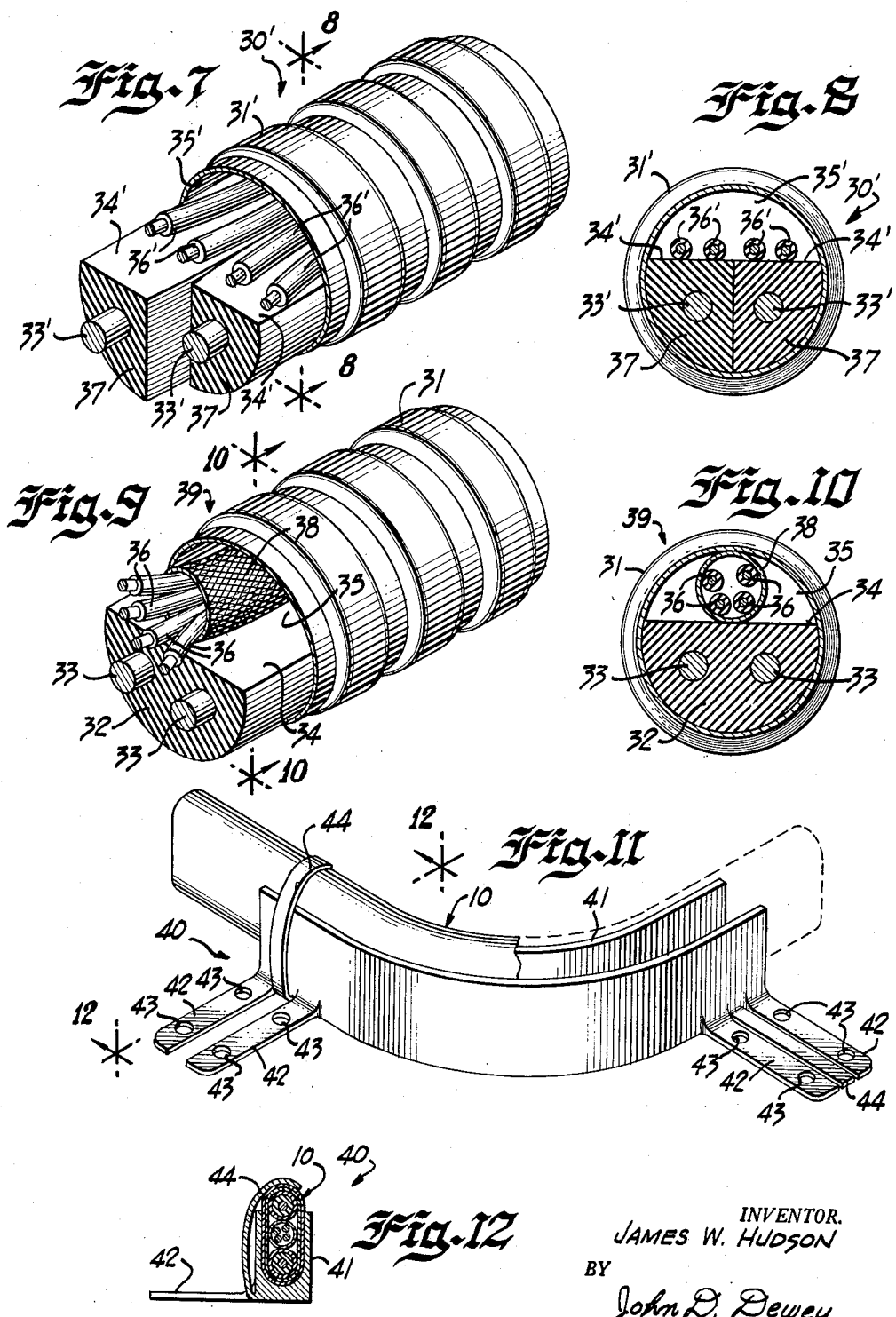
INVENTOR.
JAMES W. HUDSON
BY
John D. Dewey
ATTORNEY

United States Patent Office 3,120,575
Patented Feb. 4, 1964

3,120,575
FLEXIBLE MULTIPLE CONDUCTOR CABLE AND MOUNTING MEANS THEREFOR
James W. Hudson, 410 E. Schiller, Elmhurst, Ill.
Filed Dec. 5, 1960, Ser. No. 73,887
3 Claims. (Cl. 174—115)

The present invention relates to a new and improved type of multiple conductor flexible cable and a mounting means therefor, the cable being adapted to accommodate additional conductors and wiring following installational mounting of the cable. More specifically, the invention is directed to a basic improvement in flexible conductor cable design, the improvement residing in the provision of a built-in continuous passage in the form of a hollow core or the like through which wiring can be pulled or fed following installational mounting of the cable, the wiring fed through the passage being separate from and supplemental to one or more permanent conductors or wires which form a part of the cable in its initial form. The elements of the new and improved cable which function in defining the passage for supplemental wiring being of such nature and character as to provide for the maintaining of adequate cross sectional area during and following bending or flexing of the cable upon installational use. The invention is further specifically directed to a new and improved form of device for mounting a flexible cable of the type described, this device providing for controlled curvature and fixing of the cable to accommodate bends thereof during installational mounting and to provide for continuing availability of the passage therein for subsequent supplemental wire or conductor distribution.

There are several different types of non-metallic sheathed cable and flexible armored cable now in rather widespread use. Where wiring codes and specifications permit, such cables are often used in preference to electrical metallic tubing because of their lower cost and ease of installation. These cables are readily flexible to readily accommodate intricate runs between terminal points and are available with varying numbers of conductors which are built in the cables thus eliminating the cost involved in subsequent wire pulling. The latter advantage can often become a material disadvantage as such cables are inflexible with regard to the adding of additional conductors, replacement of conductors and the changing of basic service requirements. With a mind toward future changes in electrical services, the electrical metallic tubing system has been preferred over the flexible cable system even though there is a rather substantial difference in overall cost.

It is an object of the present invention to provide new and improved flexible multiple conductor cables which in design retain the basic advantages of standard non-metallic sheathed and armored cables while additionally providing means whereby wire feeding and service variation is made available even following operational mounting and installation of the cable.

A further object is to provide a multiple conductor cable formed from flexible sheathing in which at least one permanent conductor extends longitudinally, the cable further including means separated from the permanent conductor or conductors of the cable which is in the form of a longitudinally continuous core-like passage through which additional wiring or conductors may be distributed at will following installation of the cable.

Still a further object taken in conjunction with the foregoing objects is to provide a cable mounting means especially adapted for use in defining bends in a cable run to control such bends so that subsequent wire pulling through the special passage provided in the cable for this purpose may be accommodated with ease in much the same manner as with electrical metallic tubing.

Other objects not specifically set forth will become apparent from the following detailed description of the present invention made in conjunction with the accompanying drawings wherein:

FIG. 1 is an enlarged fragmentary perspective of a new and improved form of non-metallic sheathed cable incorporating the principles of the present invention, portions of the cable illustrated in FIG. 1 being stripped back in order to illustrate the basic elements thereof;

FIG. 2 is a cross sectional view of the cable of FIG. 1 taken generally along line 2—2 therein;

FIG. 3 is a view similar to FIG. 1 illustrating an armored cable design incorporating the principles of the present invention;

FIG. 4 is a fragmentary longitudinal section of the cable of FIG. 3 taken generally along line 4—4 therein;

FIG. 5 illustrates in enlarged fragmentary perspective still another form of cable incorporating the principles of the present invention;

FIG. 6 is a cross sectional view of the cable of FIG. 5 taken generally along line 6—6 therein;

FIG. 7 is an enlarged fragmentary perspective of a modified form of cable of the type of FIG. 5;

FIG. 8 is a cross sectional view of the cable of FIG. 7 taken generally along line 8—8 therein;

FIG. 9 is an enlarged fragmentary perspective of still another modified form of cable of the type of FIG. 5;

FIG. 10 is a cross sectional view of the cable of FIG. 9 taken generally along line 10—10 therein;

FIG. 11 is a perspective of a special cable mounting device forming a part of the present invention; and FIG. 12 is a cross sectional view of the cable mounting device of FIG. 11.

FIGS. 1 and 2 illustrate one form of non-metallic sheathed cable 10 incorporating the principles of the present invention. This cable comprises generally an outer flexible plastic, rubber or rubber-like material layer 11 surrounding a heavy duty barrier tape layer 12. The layer 12 may be formed from any suitable material including fibrous material impregnated with resinous material of the type which is capable of maintaining continuity under appreciable bending and providing good electrical insulation properties. The combined layers 11 and 12 provide the main outer sheath the interior 13 of which is basically hollow and, as illustrated, may be of generally oval shape.

Received within the sheathing defined by the layers 11 and 12 are a pair of permanent conductor members. Each of these members include a center copper wire 14 fully imbedded in a fibrous-thermoplastic insulation 15 which is in turn surrounded by a resin-treated paper armor 16. The conductor members are positioned toward opposite ends of the oval shaped interior 13 of the outer sheathing and may be held in position by receiving therebetween a cylindrical tube 17. This tube may be made from any suitable material such as bendable steel, metallic mesh, copper, aluminum, plastic, fiber, fiber-glass, etc. The material selected should be of a type which is capable of at least substantially maintaining the cylindrical shape of the tubing during bending of the cable and further to hold the permanent conductor members in their proper location within the sheathing. Obviously, where the cable 10 is of a generally flattened oval shape as illustrated thus basically requiring bending in a horizontal plane as viewed, the tube 17 may similarly be of oval shape as long as it is capable of conforming to cable bending and maintaining its general shape at least to the extent necessary. Any number of permanent conductor members may be incorporated in the sheathing of the cable 10 depending on the size and shape of the various elements.

The tubing 17 defines internally thereof a continuous hollow core-like passage 18 readily adapted to receive therethrough any number of wires or conductors 19. These wires may accommodate an entirely different electrical service as it is obvious that the same are adequately insulated from the conductors 14. By way of example, the wires 19 may carry a potential of another classification such as for D.C., communication, controls, telephone, etc. Thus the cable may carry mixtures of potentials that would not normally be permitted or considered good electrical practice in connection with the use of standard types of flexible cable. An additional aspect of considerable importance with regard to the presence of the tube 17 in the structure is that of providing a means whereby wiring can be fed, pulled or distributed through the cable 10 after a section thereof has been operatively mounted in a structure such as a home, commercial building, etc. The continuous passage 18 supplied by the tubing 17 provides an adequate area in which a "fish" may be passed through a cable section and be used in pulling a wire or groups of wires through the cable to thus provide additional service. Sections of the cable 10 would be mounted in the same manner as is now practiced with regard to the use of flexible cables and terminal connections can be made in any manner desired. It is necessary merely to maintain accessibility to opposite ends of the tubing section incorporated in the cable section to permit subsequent wire pulling or feeding. In this regard it will also be noted that the service initially fed through the tubing 17 may at any subsequent time be replaced by another service or expanded upon at will. Thus flexible cables of the type described can now be used indefinitely in the same manner as electrical metallic tubing while still maintaining the features of economy and ease of installation.

With regard to continued economy and manufacture of flexible cables, it will be appreciated that the cable 10 can be manufactured in the same manner as is now common practice with the exception that the manufacturing process will include the additional step of feeding the tubing 17 between the permanent members during cable formation. While FIGS. 1 and 2 illustrate a cable wherein the tubing 17 is centrally located, it will be appreciated that the tubing may be moved to any desired location within the outer sheathing as long as the integrity of the internal passage defined thereby is maintained.

FIGS. 3 and 4 illustrate a modified type of flexible cable 20. This cable includes an outer metallic armor 21 of known type which is formed from convoluting a metallic strip to form an intermeshing spiral. The metallic armor 21 is of the same type as is used in standard BX cable and is readily formed using known manufacturing techniques. The cable 20 further includes a layer of suitable flexible insulating material 22 received about a resin impregnated paper stock insulation 23 of known type. The layer 23 surrounds a core of flexible resinous material 24 which has imbedded therein a plurality of permanent conductor members consisting of wires 25 surrounded by suitable insulation 26 and a paper-like lining 26'. In forming the cable 20 of FIGS. 3 and 4, the permanent conductor members are imbedded in the resinous core 24 and the various insulating layers including the armor layer 21 are wrapped thereabout in a continuous manner.

The cable 20 is improved in accordance with the principles of the present invention by the provision of a longitudinally continuous passage 27 in the resinous core 24 during the formation thereof. This passage parallels the permanent conductors and is designed for use in the same manner as the tube 17 of the cable 10 of FIGS. 1 and 2. Wires 28 may be readily drawn through the passage 27 at any time prior to or subsequent to operational mounting of the cable.

As described, the core 24 of the cable 20 is preferably formed from resinous material. The pulling of wires against a plastic-type surface often results in the development of a rather substantial amount of friction. Any substantial friction will hinder the ease by which the wires may be pulled throughout a fairly long length of cable and it is preferable that some friction reducing material be applied to the inner surface of the passage 27. As best illustrated in FIG. 4, metallic braiding 29 may be readily applied to the inner surface of the passage 27 during the forming of the passage in the resinous core 24. Strands of fine wire are interwoven to provide a substantially continuous metallic surface against which the end of a "fish" as well as the insulated casings of wires will readily slide. The braided wires may be preformed in tubular shape and actually used in forming the passage 27 during the molding of the core 24. Any other suitable means such as a coiled flexible metallic band, thin copper tubing, or friction reducing coating materials may be used.

An example of a modified form of flexible inner core cable is illustrated in FIGS. 5 and 6. The cable 30 may be suitably provided with outer armor 31 of the BX type receiving interiorly thereof a resinous core 32 which has imbedded therein any number of conductors 33. The core 32 does not completely fill the interior of the armor 31 but is of sufficient volume to fill at least slightly over one-half the cross sectional area within the armor sheathing. Thus the flat surface 34 of the core 32 as best illustrated in FIG. 6 extends beyond dead center of the outer sheathing 31. In this manner the core 32 is fixed within the sheathing 31 and will not shift laterally so as to interfere with the availability of the void or passage 35 established within the sheathing for wire pulling purposes. It will be understood that the illustrations of FIGS. 5 and 6 are rather diagrammatic and the extent of the void or passage 35 established within the cable 30 may vary considerably. At any rate, it is believed that it is quite clear that any number of wires 36 may be readily pulled and distributed through the void or passage 35 within the outer sheathing 31. Here again the surface 34 of the core 32 may be suitably coated or treated to reduce plastic friction during wire pulling operations.

FIGS. 7 and 8 illustrate a modification of the cable design of FIGS. 5 and 6, primed reference numerals being used to identify similar parts. The cable 30' is modified to the extent that the flexible core carrying the permanent conductors 33' is formed from two separate sections 37—37. These sections are pie-shaped and are placed in side-by-side relation to prevent shifting thereof within the armor 31' and thus maintain the void or passage 35'.

FIGS. 9 and 10 illustrate the basic cable design of FIGS. 5 and 6 modified to the extent of having a flexible metallic tube 38 received in the void or passage 35. The modified cable 39 illustrated includes all of the parts of the cable 30 (similar reference numerals being used) and further includes an inserted flexible or readily bendable tube 38 through which the wires 36 are fed. In this manner a low friction surface for wire pulling purposes may readily be provided. Obviously, the armor sheathing of the cables of FIGS. 5–10 may be replaced by suitable resinous or fibrous sheathing.

FIGS. 11 and 12 illustrate a form of flexible cable mounting device for use in defining the radius of curvature in bend areas of the cable. When electrical metallic tubing is installed, care is taken not to exceed a specified total number of 90° bends within a specified unit of length. This type of limitation is imposed in order to assure ease of wire pulling throughout the specified unit of length. Certain restrictions might also be advantageously imposed on flexible cable of the type of the present invention in view of the fact that this improved cable now takes on the desirable features and advantages of electrical metallic tubing. Accordingly, the radius of curvature of a bend in a run of flexible cable might well be controlled in order to assure ease in subsequent wire pulling following cable installation.

The cable mounting device 40 of FIGS. 11 and 12 is merely illustrative of suitable means which may be used. This device includes a curved trough-like body portion 41 of generally U-shape in which a flexible cable such as the cable 10 of FIG. 1 may be received. The trough-like body portion 41 has projecting therefrom at suitable intervals, such as opposite ends thereof, a plurality of mounting brackets or feet 42 which are provided with openings 43 through which fastening means such as nails or screws may be received. Some suitable means should be provided to hold the cable in the trough-like body portion 41. In providing such means the brackets 42 may be centrally slit to define cable engaging tongues or fingers 44 which are readily reversely bent over the top of the trough 41 into clamping engagement with the outer surface of the cable 10 as shown in FIG. 12. In this manner the cable may be secured in the trough 41 and the radius of curvature of the cable at a bend thereof is controlled.

The cable mounting device 40 illustrated in FIGS. 11 and 12 supplies the cable 10 with a 90° bend which will preferably be the maximum radius of curvature for a cable at a single bend such as is the case in the use of electrical metallic tubing. It will be appreciated however that cable mounting brackets incorporating the principles of the present invention may define varying radii of curvature of less than 90°. By use of a cable mounting device capable of functioning in the manner as the device 40 illustrated, the improved flexible cable of the present invention is capable of functioning in the same manner as electrical metallic tubing. Wire pulling through the internal passage provided for this purpose in the flexible cable may be accomplished with the same ease as in the case of electrical metallic tubing. The trough-like portion 42 of the mounting device 40 may be varied in contour to readily accommodate any shape of flexible cable.

As previously described, the improved design principles of flexible cables of the present invention may be used to advantage in the distribution of many types of wire services. Antenna wires for television, radio and the like may be readily distributed through a flexible cable system thus providing for hidden wire installation. The flexible cable may be used for intercom and multiple speaker installations in conjunction with electrical power for other electrical services. In certain instances where a plurality of low potential services are desired, the wires of these services may be jointly run through the passage provided therefor in the flexible cable. The principles of the present invention may be incorporated in any suitable type of flexible cable used in home and commercial installations. The invention covers in scope the non-metallic sheathed cables, armored or semi-armored cables such as used as service entrance cables, shipboard cables, control cables, etc. The wiring techniques for terminal connections will be slightly varied from standard procedures in that at terminals the wires of the separate services must be separated. This may be readily accomplished by the use of suitably divided terminal boxes and the like bearing in mind that the flexible cable is designed for ready wire stripping and separation in the usual manner.

Obviously, other embodiments of the present invention not illustrated herein are intended to come within the scope thereof, this scope being defined by the appended claims.

I claim:

1. A multiple conductor cable comprising a separate flexible protective sheathing surrounding a separate flexible resinous core which substantially fills the interior of said sheathing to an extent that said core is restricted from lateral movement within said sheathing relative thereto, at least one portion of said core defining with a portion of said sheathing an internal longitudinally continuous void-like passage which extends throughout the length of said cable in communication with opposite ends thereof for removable insertion of a separate continuous conductor therethrough, and at least one additional conductor fully embedded in said core and extending longitudinally of said cable as a fixed part thereof.

2. The cable of claim 1 wherein said passage has received therein a longitudinally continuous flexible tube through which said separate conductor is received.

3. The cable of claim 1 wherein said core fills said sheathing to an extent of at least slightly more than one-half of the cross sectional area of said sheathing.

References Cited in the file of this patent

UNITED STATES PATENTS

| 989,532 | MacDuffee | Apr. 11, 1911 |
| 1,296,952 | Handley | Mar. 11, 1919 |
| 2,139,742 | Fralick | Dec. 13, 1938 |
| 2,234,672 | Johnson | Mar. 11, 1941 |
| 2,372,674 | Jordan | Apr. 3, 1945 |
| 2,647,160 | Hood | July 28, 1953 |
| 2,767,239 | Kenney | Oct. 16, 1956 |

FOREIGN PATENTS

| 572,339 | Great Britain | Oct. 3, 1945 |